United States Patent [19]
Hoke

[11] 3,763,727
[45] Oct. 9, 1973

[54] SPRING LOADED ECCENTRIC TURNING TOOL

[76] Inventor: William A. Hoke, 517 Overdale Rd., Baltimore, Md. 21229

[22] Filed: Oct. 12, 1971

[21] Appl. No.: 188,118

[52] U.S. Cl. .................................. 82/36 R, 29/97.5
[51] Int. Cl. ............................................. B23b 29/14
[58] Field of Search ...................... 82/36 R; 29/97.5

[56] References Cited
UNITED STATES PATENTS

| 2,391,142 | 12/1945 | Drake | 29/97.5 |
| 1,407,764 | 2/1922 | Osberg | 29/97.5 |
| 1,245,020 | 10/1917 | Pianarosa | 29/97.5 |

Primary Examiner—Leonidas Vlachos
Attorney—Walter G. Finch

[57] ABSTRACT

A device is provided that is used on a lathe for holding a cutting tool. It is designed to follow any eccentricities encountered when working with off-center rollers.

7 Claims, 4 Drawing Figures

PATENTED OCT 9 1973

WILLIAM A. HOKE
INVENTOR

BY Walter G. Finch
ATTORNEY

WILLIAM A. HOKE
INVENTOR

BY Walter G. Finch
ATTORNEY

SPRING LOADED ECCENTRIC TURNING TOOL

It consists of two metal plates, joined together at the top by a pivot screw assembly, and spring loaded on the bottom. One plate is held stationary in the tool holder of the lathe, while the other plate is movable and has the cutting tool attached to it. The spring is adjustable, and it is used to control the tension of the cutting tool against the roller that is being worked upon, thereby allowing the cutting tool to follow the roller, be it concentric or eccentric.

This invention relates generally to lathes, and more particularly to an adjustable spring loaded eccentric turning tool.

When a conventional lathe is used, as an example, to remove rubber or plastic covering from steel rollers, a problem arises in that the steel roller cores do not always run dead true when placed on center. They may be eccentric as much as three-eights of an inch. Thus, when an eccentric roller is encountered, while using the conventional lathe tool set-up, that is, an unyeilding cutting tool, some of the metal surface of the steel roller will be inadvertently removed along with the rubber or plastic covering. This is prohibitive in most cases.

It is, therefore, the object of this invention to provide a unique tool for removing the rubber or plastic covering from a steel roller, that will allow the cutting edge of the tool to follow any eccentricities in the steel cores of the rollers that may be encountered.

This is accomplished by having the cutting tool attached onto an adjustable spring loaded, movable plate. This plate is pivot mounted onto a stationary plate which, in turn, is attached onto the conventional tool holder on the lathe.

Another object of this invention is to provide a spring loaded cutting tool which permits the use of the latest type carbide cutting tools, and which is a standard, replacable, shelf item giving long service, without grinding or replacing the tool.

Other objects and attendant advantages of this invention will become more readily apparent and understood from the following detailed specification and accompanying drawings in which.

Figure 1:
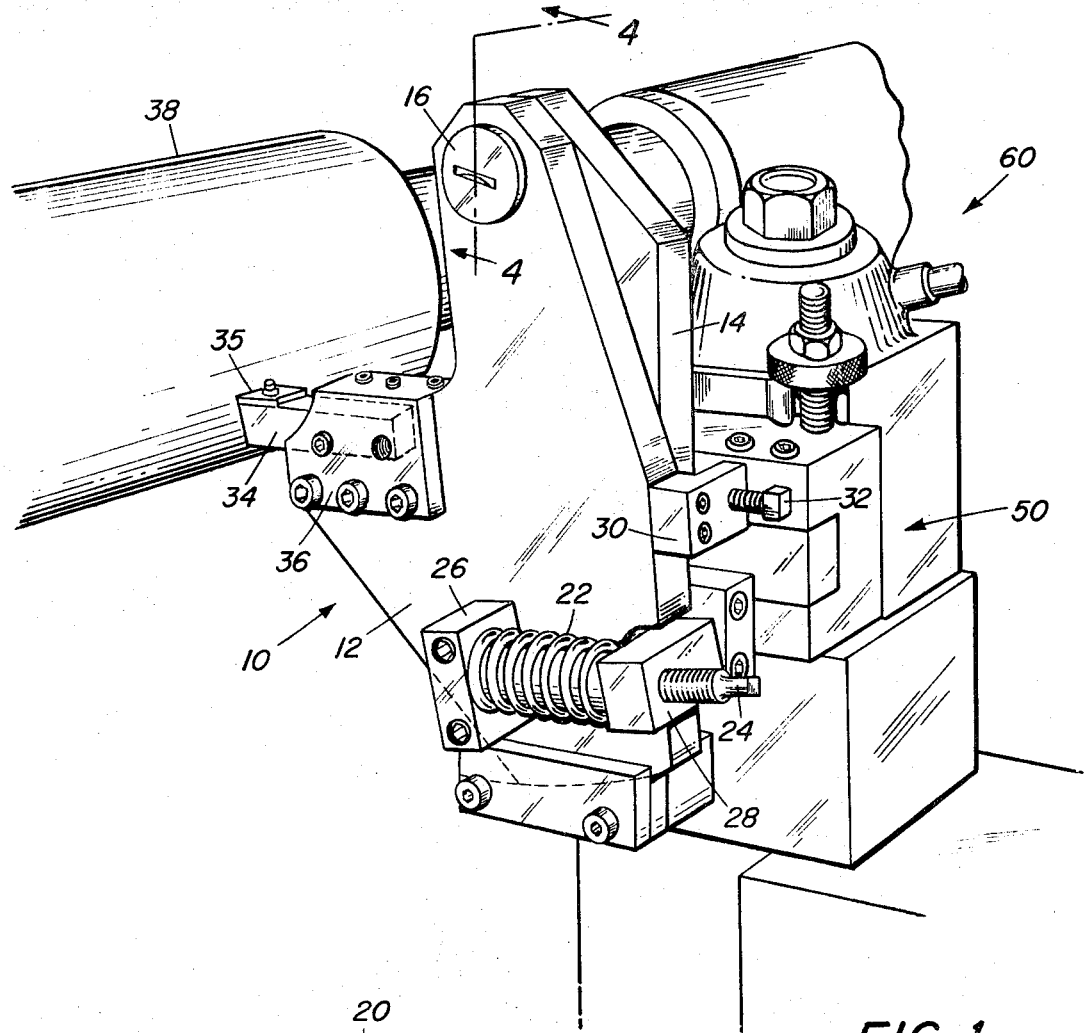
FIG. 1 is a perspective view of a spring loaded eccentric turning tool incorporating features of this invention, attached to a conventional tool holder, on a lathe.
Figure 4:
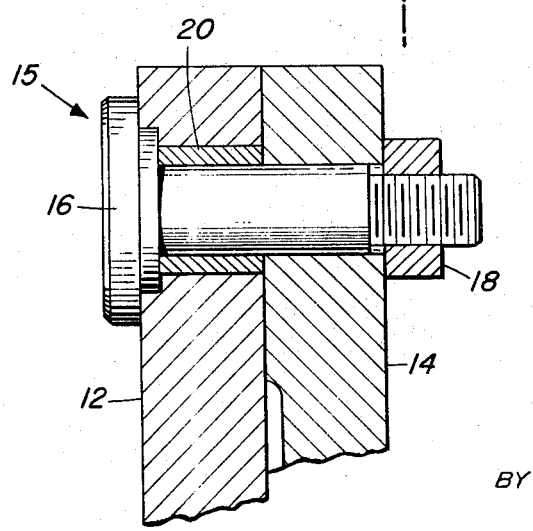
FIG. 4 is a cross section taken along line 4—4 of FIG. 1, showing two plates of the tool held together by the pivot screw assembly.

Referring now in detail to the drawings in which like reference numbers refer to like parts in all figures, in FIG. 1 there is shown a spring loaded eccentric turning tool assembly 10 attached to a conventional tool holder 50 on a lathe 60. This assembly 10 is an adapter to hold the cutting tool 34. It consists of a standard cutting tool 34 which is attached by it attaching plate 36 to a plate 12. This plate 12 is movable, being pivoted at its top by a pivot assembly 15, which consists of a screw 16, a nut 18 and a bushing 20, as viewed best in FIG. 4. The movable plate 12 is mounted by a pivot assembly 15 onto a second, stationary plate 14, which, in turn, is attached to the lathe 60 tool holder 50. The spring 22 is mounted, one end, by its attaching block 26, onto the movable plate 12. The other end of the spring 22 is mounted, by its attaching block 28, onto the stationary plate 14. The tension of the spring 22 is adjustable by the action of screw 24 to provide adequate cutting force for the various sizes and different materials of the work 38.

Figure 3:
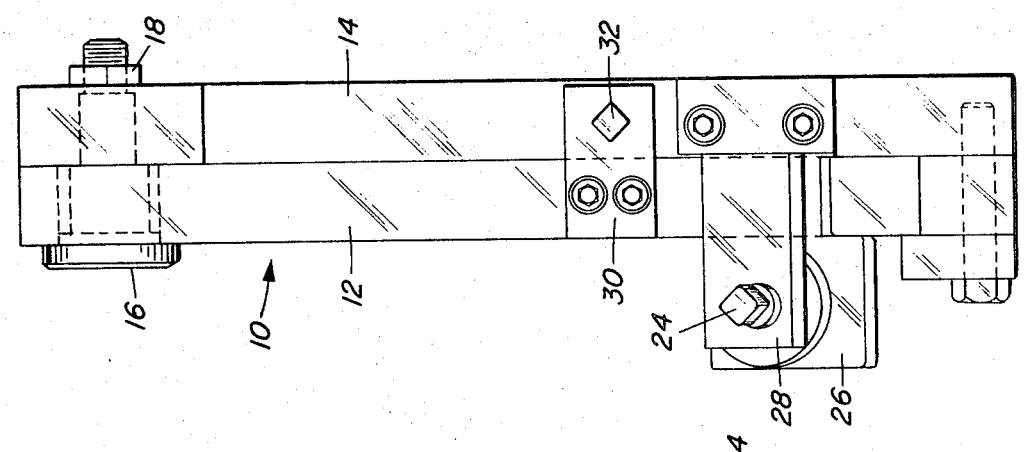
FIG. 3 is an end view of the tool assembly as shown in FIG. 2.
Figure 2:
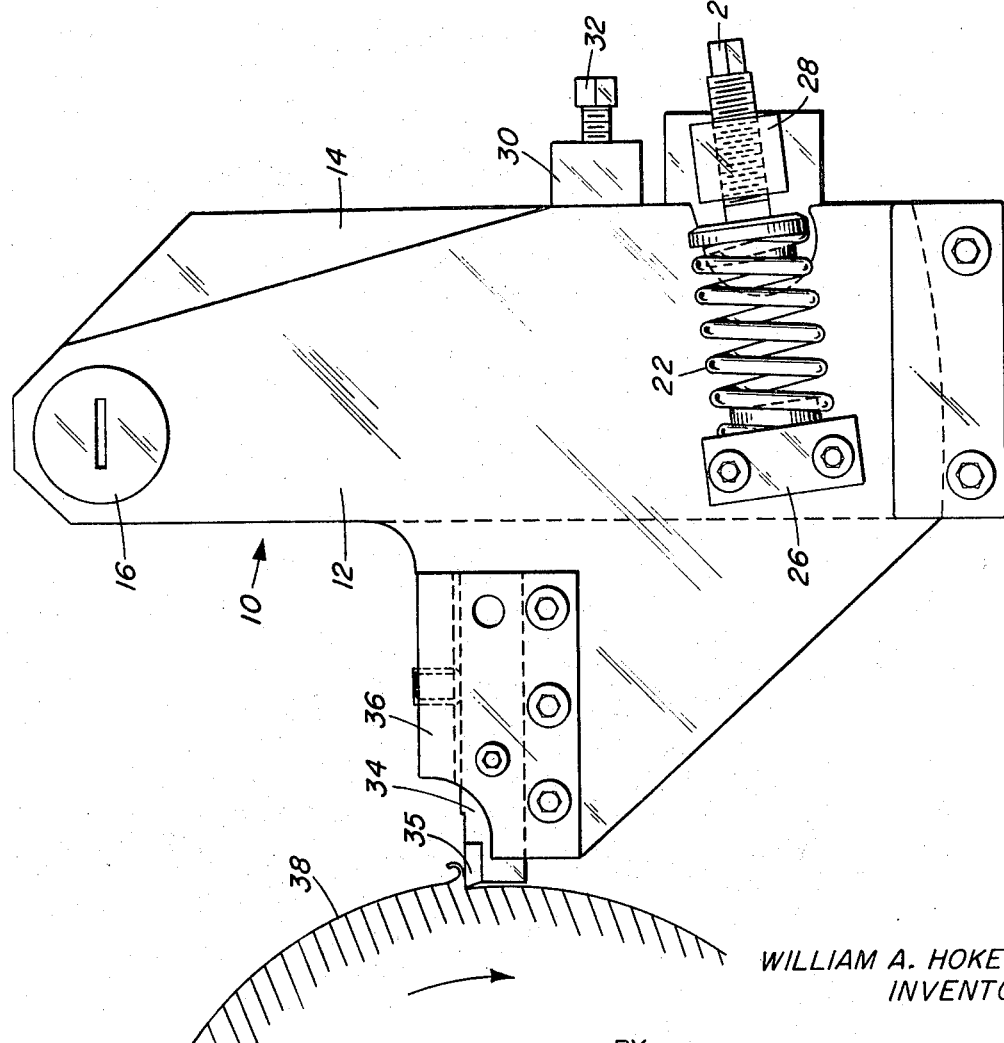
FIG. 2 is a side view of the tool assembly, showing the cutting tool positioned against the roller which is being worked upon.

In FIG. 2 and 3, there is shown the cutting edge 35 of the cutting tool 34 pressed against the roller 38 that is being worked upon. As the roller 38 rotates, the tool 34 will follow it, be it running concentric or eccentric. The stop 30 which is mounted onto, and governs the travel of, the movable plate 12, is adjusted by the action of the screw 32.

In FIGS. 1, 2 and 3, there is shown a guide which is secured to the bottom of the stationary plate 14 and which receives the bottom of the movable plate 12. The guide provided a means for insuring that the movable plate 12 is retained in the plane in which it is suspended from the pivot assembly 15. The guide includes a slot having side walls which are spaced apart a distance sufficient to receive the base of the movable plate 12 therebetween. The base of the slot is contoured, as shown in FIGS. 1 and 2, in structure complementary to the bottom coutour of the movable plate 12 to permit freedom of movement of the base within the slot.

Obviously many modifications and variations of the present invention are possible in light of the above teachings. It is, therefore, to be understood that within the scope of the appended claims the invention may be practiced otherwise than as specifically described.

What is claimed is:

1. A spring loaded eccentric turning tool assembly for holding a cutting tool which will follow eccentricities encountered when working on off-center rollers, comprising, a pair of structural members, one of said structural members being fixed to the tool holder of a lathe, the other of said pair of structural members having opposite ends, means for pivotally mounting said structural members together so that the other structural member of said pair of structural members is mounted for pivotal movement about the upper end thereof, a cutting tool mounted on said movable structural member intermediate the opposite ends thereof and extending laterally in one direction from one side of said movable structural member, for cutting material from a roller, spring loaded biasing means attached to said structural members at the opposite end of said movable structural member to provide a predetermined amount of tension for said cutting tool in the same direction in which the tool extends laterally from said movable structural member, means for adjusting the tension of said spring loaded biasing means, and means affixed to said fixed structural member for receiving and guiding the lower end of said movable member as said movable member moves under the force of said biasing means.

2. A spring loaded eccentric turning tool assembly as recited in claim 1, and additionally said means for adjusting the tension of said spring loaded biasing means being positioned to permit adjustment during a cutting operation.

3. A spring loaded eccentric turning assembly as recited in claim 1, wherein said structural members consist of plates pivotally mounted together along one end.

4. A spring loaded eccentric turning assembly as recited in claim 1, wherein said spring loaded biasing means consists of a coiled spring.

5. A spring loaded eccentric turning assembly as recited in claim 1, wherein the cutting tool extends in one direction from an intermediate section of said movable structural member and is movable to and fro about said pivotal mounting and forces resulting from the tension of said spring loaded biasing being urged in substantially the same direction about said pivotal mounting to permit to and fro movement of the tool in response to the eccentricities of the off-center rollers.

6. A spring loaded eccentric turning assembly as recited in claim 1, and additionally adjustable means mounted on said movable structural and engagable with said fixed structural for precluding movement of the cutting tool beyond a selected point toward the off-center rollers.

7. A spring loaded eccentric turning assembly as recited in claim 1, and additionally said guiding and receiving means including a slot having sidewalls spaced to receive the base of said movable structural member and the base of said slot being formed with structure complementary to the bottom of said movable structural member to permit freedom of movement of said base within said slot.

* * * * *